(12) United States Patent
Marines et al.

(10) Patent No.: US 12,341,321 B2
(45) Date of Patent: Jun. 24, 2025

(54) MOUNT FOR ELECTRONIC DEVICE

(71) Applicant: Schweitzer Engineering Laboratories, Inc., Pullman, WA (US)

(72) Inventors: Tyler L. Marines, Moscow, ID (US); Steven T. Watts, Boise, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 498 days.

(21) Appl. No.: 17/811,734

(22) Filed: Jul. 11, 2022

(65) Prior Publication Data
US 2024/0014636 A1    Jan. 11, 2024

(51) Int. Cl.
*H02B 1/01*    (2006.01)

(52) U.S. Cl.
CPC .................. *H02B 1/012* (2013.01)

(58) Field of Classification Search
CPC ...... H02B 1/012; H02B 1/052; H02B 1/0523; H02B 1/0526; H05K 7/1474; H05K 7/1401; H05K 7/023; H05K 5/0204; H05K 5/30; H05K 5/0065; H05K 5/0286; H01R 9/26; H01H 85/54
USPC ......... 248/316.4, 346.07, 313; 439/532, 717, 439/716
See application file for complete search history.

(56) References Cited

U.S. PATENT DOCUMENTS

| | | |
|---|---|---|
| D402,184 S | 12/1998 | Smith |
| D540,154 S | 4/2007 | Bremmon |
| D555,459 S | 11/2007 | Goodwin |
| D563,962 S | 3/2008 | Grey |
| D660,135 S | 5/2012 | Goulden |
| D937,663 S | 12/2021 | Welander |
| D968,931 S | 11/2022 | Barron |
| D996,956 S | 8/2023 | Fehr |
| D997,692 S | 9/2023 | Hamel |
| D1,048,859 S | 10/2024 | Marines |
| 2005/0186857 A1* | 8/2005 | Sichner .................. H05K 5/069 439/717 |

OTHER PUBLICATIONS

SEL 2814, Schweitzer Engineering Laboratories, https://selinc.com/products/2814/#tab-options, retrieved Mar. 20, 2024 (Year: 2024).

* cited by examiner

*Primary Examiner* — Roshn K Varghese
(74) *Attorney, Agent, or Firm* — Fletcher Yoder, P.C.

(57) ABSTRACT

A mount for an electronic device includes a first mount portion having a first base and a first extension extending crosswise to a first base surface of the first base. The mount also includes a second mount portion having a second base, a channel support extending from the second base, a lateral wall extending from the channel support, and a second extension extending crosswise to a second base surface of the second base. The second base, the channel support, and the lateral wall define a channel configured to receive the first base of the first mount portion, and the first base surface, the second base surface, the first extension, and the second extension cooperatively define a space configured to receive the electronic device.

20 Claims, 11 Drawing Sheets

MOUNT FOR ELECTRONIC DEVICE

BACKGROUND

This disclosure relates to electric power delivery systems. More particularly, this disclosure relates to a mount for securing an electronic device of an electric power delivery system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of any kind.

Electric power delivery or distribution systems carry electricity from a transmission system to residential communities, factories, industrial areas, and other electricity consumers. An electric power delivery system may include various electronic devices, such as intelligent electronic devices (IEDs) that operate to facilitate delivery of electricity for the electric power delivery system. For example, an electronic device may receive and/or transmit a signal and/or data in order to perform a functionality, such as to control a circuit breaker in response to electrical measurements of the electric power delivery system. It may be desirable to secure a positioning of an electronic device within the electric power delivery system, such as to a mounting surface or component.

SUMMARY

Certain examples commensurate in scope with the originally claimed subject matter are discussed below. These examples are not intended to limit the scope of the disclosure. Indeed, the present disclosure may encompass a variety of forms that may be similar to or different from the examples set forth below.

In an embodiment, a mount for an electronic device includes a first mount portion having a first base and a first extension extending crosswise to a first base surface of the first base. The mount also includes a second mount portion having a second base, a channel support extending from the second base, a lateral wall extending from the channel support, and a second extension extending crosswise to a second base surface of the second base. The second base, the channel support, and the lateral wall define a channel configured to receive the first base of the first mount portion, and the first base surface, the second base surface, the first extension, and the second extension cooperatively define a space configured to receive the electronic device.

In an embodiment, a mount piece for an electronic device mount includes a base extending from a primary section of the mount piece to a protruding section of the mount piece, a channel support extending from the base at the protruding section, and a lateral wall extending from the channel support. The base has a first recess formed at the primary section and a second recess formed between the primary section and the protruding section, the first recess and the second recess are formed at opposite sides of the channel support, and the base, the channel support, and the lateral wall cooperatively define a channel at the primary section.

In an embodiment, an electronic device mount includes a first mount portion having a first base and a second mount portion having a second base. The first base includes a first recess and a second recess formed into a first wall of the first base, the second base includes a projection extending from a second wall of the second base, the projection is configured to engage with the first recess of the first mount portion in a first configuration of the electronic device mount, and the projection is configured to engage with the second recess of the first mount portion in a second configuration of the electronic device mount to interchangeably adjust the electronic device mount between the first configuration and the second configuration.

DETAILED DESCRIPTION

Figure 1:
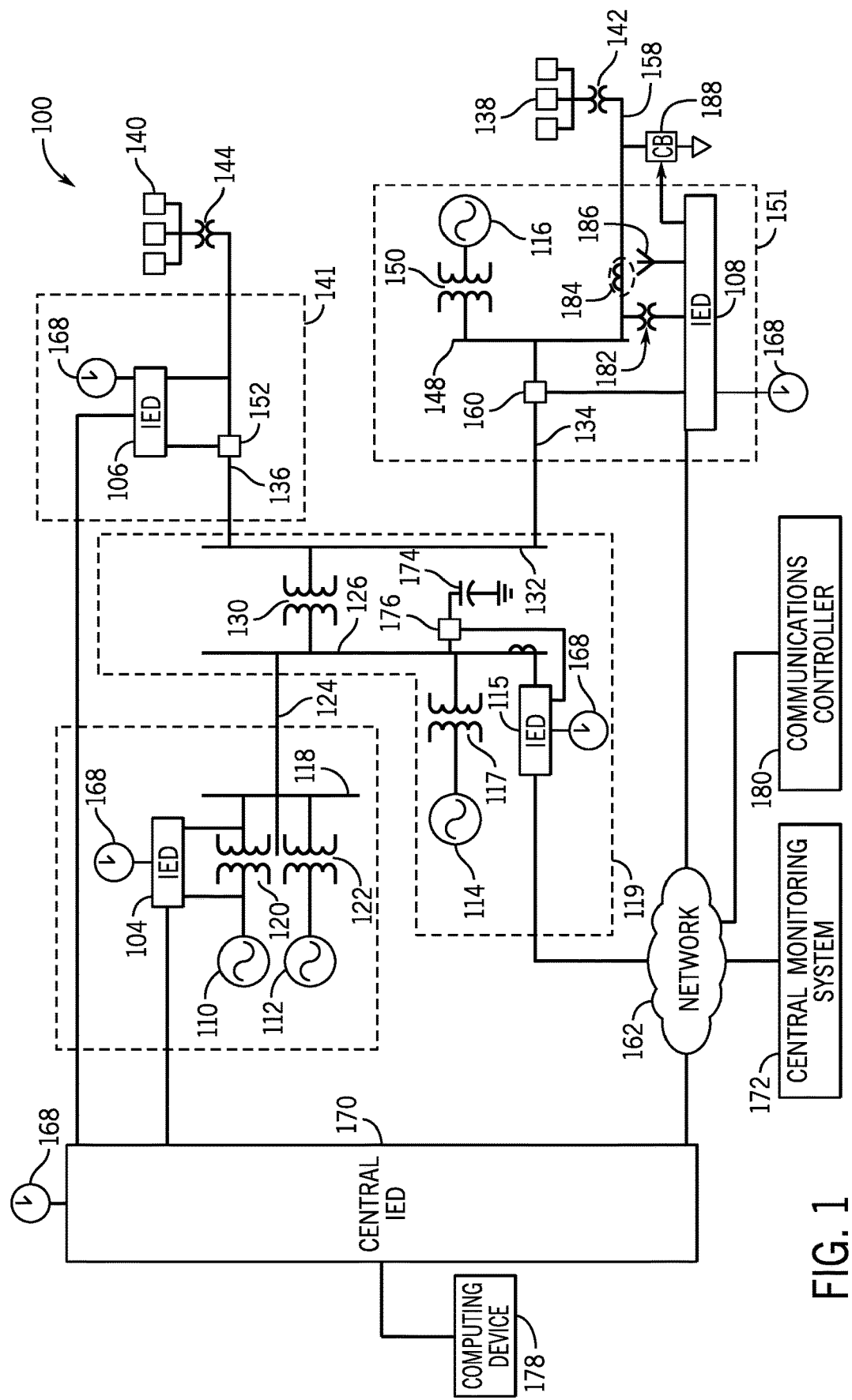
FIG. 1 is a schematic diagram of an embodiment of an electric power delivery system, in accordance with an aspect of the present disclosure.

One or more specific embodiments will be described below. In an effort to provide a concise description of these embodiments, not all features of an actual implementation are described in the specification. It should be noted that in the development of any such actual implementation, as in any engineering or design project, numerous implementation-specific decisions must be made to achieve the developers' specific goals, such as compliance with system-related and business-related constraints, which may vary from one implementation to another. Moreover, it should be noted that such a development effort might be complex and time consuming, but would nevertheless be a routine undertaking of design, fabrication, and manufacture for those of ordinary skill having the benefit of this disclosure. Certain examples commensurate in scope with the originally claimed subject matter are discussed below. These examples are not intended to limit the scope of the disclosure. Indeed, the present disclosure may encompass a variety of forms that may be similar to or different from the examples set forth below.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

The embodiments of the disclosure will be best understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the procedures of a method do not necessarily need to be executed in any specific order, or even sequentially, nor need the procedures be executed only once, unless otherwise specified. In some cases, well-known features, structures or operations are not shown or described in detail. Furthermore, the described features, structures, or operations may be combined in any suitable manner in one or more embodiments. The components of the embodiments as generally described and illustrated in the figures could be arranged and designed in a wide variety of different configurations.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

Embodiments of the present disclosure are directed to a mount, such as an adjustable or configurable mount. The mount may secure an electronic device, which may be of an electric power delivery system or an electric power distribution system, to a mounting surface. The electronic device, such as an intelligent electronic device (IED), may be used to control certain devices and to perform certain operations of the electric power delivery system. For example, the electronic device may include a relay that enables or blocks electrical power flow between other devices of the electric power delivery system. The electronic device may, for instance, communicate with a computing device, and the electronic device may operate based on the communication with the computing device (e.g., based on a signal transmitted by the computing device via a user input). Furthermore, multiple electronic devices may transmit data, such as operating information or sensor data, to one another to control various functions of devices of the electric power delivery system. As such, the electronic device may facilitate operation of the electric power delivery system.

It may be desirable to secure a positioning of an electronic device within the electric power delivery system. For instance, securement of the electronic device may facilitate maintaining physical and/or communicative connections between the electronic device and another device to improve operation of the electronic device and/or the other device. Additionally or alternatively, securement of the electronic device may block movement of the electronic device that may otherwise cause undesirable contact between the electronic device and another object, such as contact that may impart a force onto the electronic device. As such, securement of the electronic device may improve a structural integrity and/or useful lifespan of the electronic device.

Accordingly, it is presently recognized that securement of the electronic device may improve operation of an electric power delivery system. Thus, embodiments of the present disclosure include a mount for securing an electronic device to a mounting surface and/or another suitable component. The mount may be adjustable between a compact configuration and an extended configuration to enable receipt of different electronic devices. In the compact configuration, the mount may define a first space in which a first electronic device may be positioned to secure to the mount. Additionally, in the compact configuration, the mount may have a hole that can receive a fastener to secure the mount to another component, such as to a mounting surface, to secure the first electronic device to the other component. In the extended configuration, the mount may define a second space in which a second electronic device, different from the first electronic device, may be positioned to secure to the mount. The mount may also include a hole in the extended configuration to enable securement of the mount, and therefore of the second electronic device, to another component.

As an example, the second space associated with the extended configuration may be relatively larger than the first space associated with the compact configuration. Therefore, the mount may be able to receive a larger electronic device in the extended configuration than in the compact configuration. In this manner, a single embodiment of the mount may be manufactured and implemented in different systems to enable positioning and securement of different embodiments, sizes, and/or or types of electronic devices, such as electronic devices having different dimensions (e.g., lengths), in the different systems. Thus, the mount described herein may reduce a cost and/or complexity associated with securement of different electronic devices.

In some embodiments, the mount may be modular and may have multiple mount portions or mount pieces that are adjustably coupled to one another. For example, each portion may be of a similar or the same embodiment. Thus, multiple mount portions of a single embodiment may be manufactured, and any of such mount portions may be selected and coupled to one another to provide a suitable mount. Each mount portion may include a projection and a plurality of recesses. A first mount portion and a second mount portion may be coupled to one another by engaging the projection of one of the mount portions with a first recess of the other of the mount portions to provide a mount in the compact configuration. The coupling between the first mount portion and the second mount portion may be adjusted such that the projection of one of the mount portions is engaged with a second recess of the other of the mount portions to provide a mount in the extended configuration. In this manner, adjusting engagement between the projections and the plurality of recesses may adjust the mount between different configurations to enable receipt of a particular electronic device via the mount. In each configuration, opposing recesses (e.g., the second recesses) of the mount portions may engage with one another to form the hole through which a fastener may be inserted to secure the mount to another component. Additionally, in each configuration, additional features of the mount portions may interlock one another to block relative movement between the mount portions and secure the mount portions in a particular configuration. Adjustment of the coupling between the mount portions may be manually performed, such as without additional tooling, thereby improving ease of adjustment of the mount between different configurations and further facilitating positioning of different electronic devices in various systems.

Although the present disclosure primarily discusses adjusting the mount between a compact configuration and an extended configuration, the mount may be able to adjust between additional configurations, such as one or more intermediate configurations, in additional or alternative embodiments to enable securement to any suitably sized electronic device. Furthermore, the mount may be adjustable in any suitable direction (e.g., along a longitudinal axis, along a vertical axis, along a lateral axis) to accommodate a corresponding dimension (e.g., a length, a height, a width) of the electronic device.

With the preceding in mind, FIG. 1 is a schematic diagram of an electric power delivery system 100 that may generate, transmit, and/or distribute electric energy to various loads (e.g., different structures). The electric power delivery system 100 may use various IEDs 104, 106, 108, 115 to control certain aspects of the electric power delivery system 100. As used herein, an IED (e.g., the IEDs 104, 106, 108, 115) may refer to any processing-based device that monitors, controls, automates, and/or protects monitored equipment within the electric power delivery system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power delivery system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power delivery system 100. For example, the IEDs 104, 106, 108, 115 may be used to monitor equipment of many types, including electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power delivery system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power delivery system 100 using a communications network 162 and/or using a common time source, such as a Global Navigation Satellite System ("GNSS"), or the like.

The IEDs 104, 106, 108, 115 may be used for controlling various other equipment of the electrical power delivery system 100. By way of example, the illustrated electric power delivery system 100 includes electric generators 110, 112, 114, 116 and power transformers 117, 120, 122, 130, 142, 144, 150. The electric power delivery system 100 may also include electric power lines 124, 134, 136, 158 and/or busses 118, 126, 132, 148 to transmit and/or deliver power, circuit breakers 152, 160, 176 to control flow of power in the electric power delivery system 100, and/or loads 138, 140 to receive the power in and/or from the electric power delivery system 100. A variety of other types of equipment may also be included in the electric power delivery system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the bus 132 (e.g., a distribution bus) via the power transformer 130 (e.g., a step-down transformer). Various electric power lines 136, 134 may be connected to the bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A central IED 170 (e.g., a switch) may be in communication with the IEDs 104, 106, 108, 115. The IEDs 104, 106, 108, 115 may be remote from the central IED 170 and may communicate over various media. For instance, the central IED 170 may be directly in communication with the IEDs 104, 106 and may be in communication with the IEDs 108, 115 via the communications network 162.

The central IED 170 may enable or block data flow between any of the IEDs 104, 106, 108, 115. For example, during operation of the electric power delivery system 100, the IEDs 104, 106, 108, 115 may transmit data with one another to perform various functionalities for the electric power delivery system 100 by initially transmitting the data to the central IED 170. The central IED 170 may receive the data and may subsequently transmit the data to an intended recipient of the data. The central IED 170 may also control data flow between one of the IEDs 104, 106, 108, 115 and another device communicatively coupled to the central IED 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power delivery system 100 via the central IED 170 and/or to send data, such as a user input, to the electric power delivery system 100 via the central IED 170. Thus, the central IED 170 may enable or block operation of the electric power delivery system 100 via the computing device 178.

A communications controller 180 may interface with equipment in the communications network 162 to create a software-defined network that facilitates communication between the central IED 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the central IED 170 to instruct the central IED 170 to transmit certain data (e.g., data associated with a certain set of characteristics or information) to a particular destination (e.g., an intended recipient) using flows, matches, and actions defined by the communications controller 180.

Figure 2:
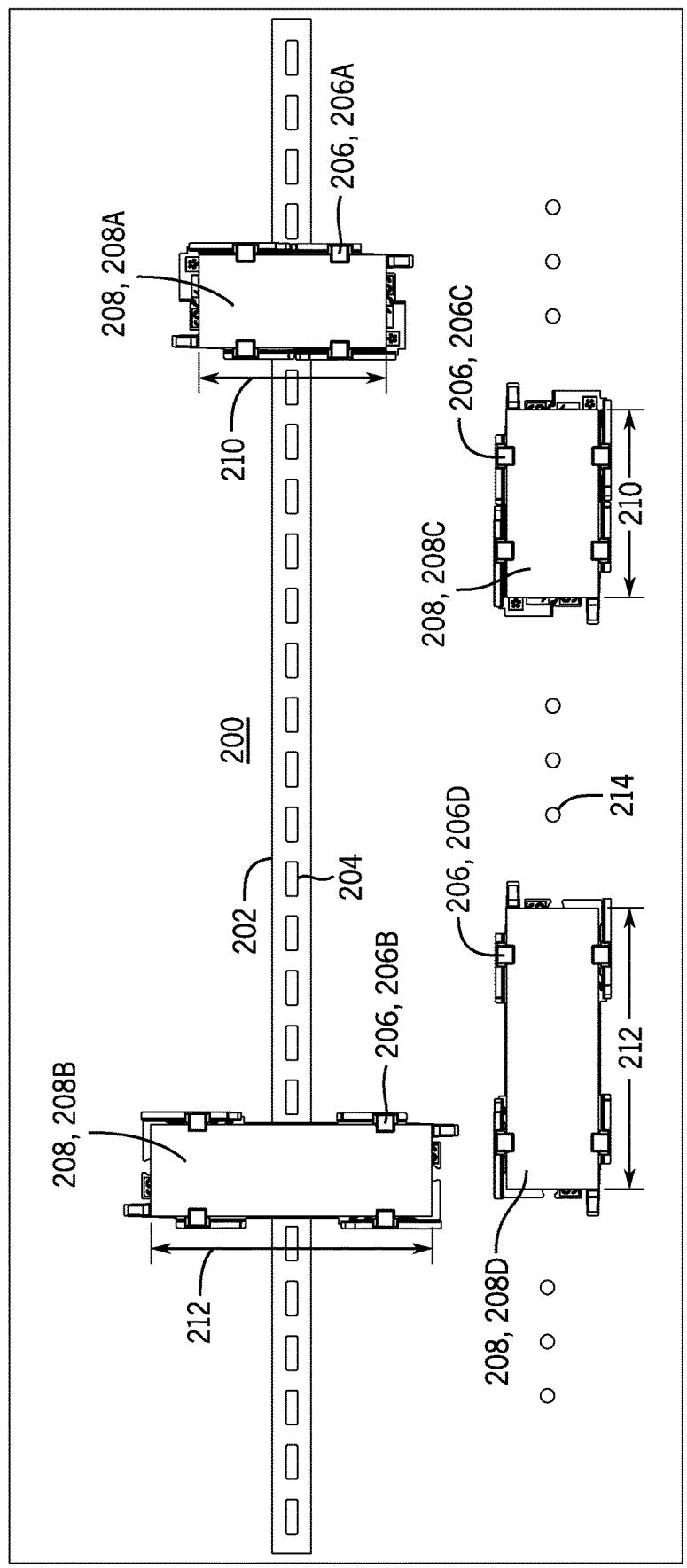
FIG. 2 is a schematic diagram of an embodiment of a mounting surface of an electric power delivery system having mounts that secure respective electronic devices onto the mounting surface, in accordance with an aspect of the present disclosure.

FIG. 2 is a schematic diagram of an embodiment of a mounting surface 200 with various electronic devices secured to the mounting surface 200. For example, the mounting surface 200 may include a panel, which may be disposed within an enclosure to shield the electronic devices from environmental factors, such as dust, debris, precipitation, moisture, an ambient temperature, and so forth. In the illustrated embodiment, the mounting surface 200 includes a mounting rail 202, such as a DIN rail and/or a hat channel, with first openings 204 formed through the mounting rail 202 and used to secure the mounting rail 202 to the mounting surface 200 (e.g., via a fastener). A first mount (e.g., a first electronic device mount) 206A may be coupled to the mounting rail 202. For instance, as further described herein, the first mount 206A may be secured to a clip (e.g., a DIN rail mounting clip), and the clip may be secured to the mounting rail 202 to couple the first mount 206A to the mounting rail 202. A second mount (e.g., a second electronic device mount) 206B may also be coupled to the mounting rail 202 via another clip. In some embodiments, the first mount 206A and/or the second mount 206B may include additional features for securement to the clips. For example, the first mount 206A and/or the second mount 206B may include lips that capture the respective clips to block relative movement between the mounts 206 and the clips and therefore between the mounts 206 and the mounting rail 202.

The first mount 206A may also be secured to a first electronic device 208A, and the second mount 206B may be secured to a second electronic device 208B. Thus, the first mount 206A and the second mount 206B may secure the first electronic device 208A and the second electronic device 208B, respectively, to the mounting surface 200. By way of example, the first electronic device 208A and/or the second electronic device 208B may include any combination of transceivers, receivers, transmitters, relays, sensors, controllers, and so forth. For instance, the first electronic device 208A and/or the second electronic device 208B may communicate with one another and/or another device during operation.

The first electronic device 208A may have a first dimension 210 (e.g., a first length), and the second electronic device 208B may have a second dimension 212 (e.g., a second length) that is greater than the first dimension 210. Thus, the first mount 206A and the second mount 206B may be arranged in different manners to accommodate the different dimensions 210, 212 of the first electronic device 208A and the second electronic device 208B for securement. For example, each of the first mount 206A and the second mount 206B may be of the same embodiment arranged in different configurations. The first mount 206A may be in a first configuration, such as a compact configuration, to capture the first dimension 210 of the first electronic device 208A to secure to the first electronic device 208A. The second mount 206B may be in a second configuration, such as an extended configuration, to capture the second dimension 212 of the second electronic device 208B to secure to the second electronic device 208B. In this manner, the same mount embodiment may be adjustable between the first configuration and the second configuration to secure to different electronic devices that may have different lengths. In other words, a single mount may be adjusted to the first configuration (e.g., as in the first mount 206A) to secure to the first electronic device 208A and adjusted to the second configuration (e.g., as in the second mount 206B) to secure to the second electronic device 208B. As such, the same mount embodiment may be manufactured and implemented to secure different electronic devices 208 to the mounting surface 200, thereby reducing a cost of manufacture, improving an ease of installation, increasing configurability, and the like, as compared to utilizing different mount embodiments dedicated to secure to electronic devices 208 having different sizes (e.g., lengths).

Additionally or alternatively, a mount may be secured directly to the mounting surface 200. As an example, the mounting surface 200 may have second openings 214 formed therethrough. A third mount (e.g., a third electronic device mount) 206C and a fourth mount (e.g., a fourth electronic device mount) 206D may be secured directly to the mounting surface 200 via the second openings 214, such as using respective fasteners inserted through the third mount 206C and/or the fourth mount 206D and the corresponding second openings 214. As another example, the third mount 206C and/or the fourth mount 206D may be attached to an adhesive (e.g., dual-sided adhesive), such as via lips that capture respective adhesive components, and the adhesive may secure to the mounting surface 200 or to any other suitable surface to couple the third mount 206C and/or the fourth mount 206D to such a surface. The third mount 206C may be secured to a third electronic device 208C, which may have the first dimension 210, and the fourth mount 206D may be secured to a fourth electronic device 208D, which may have the second dimension 212. The third mount 206C and the fourth mount 206D may also be of the same embodiment (e.g., the same embodiment as the first mount 206A and/or the second mount 206B) and adjustable between different configurations to secure to the differently sized electronic devices 208. In this manner, the same mount embodiment may also be able to secure to different components, such as to the mounting rail 202 and/or directly to the mounting surface 200, thereby improving configurability of the mount embodiment. Indeed, such a mount may be able to secure to any other suitable component to secure an electronic device 208 in any desirable manner.

Although the illustrated mounts 206 and the electronic devices 208 have a generally rectangular geometry, it should be noted that in additional or alternative embodiments, the electronic devices 208 may have any suitable geometry or profile, and the mounts 206 may have a corresponding geometry or profile to secure to the electronic devices 208. Indeed, the mounts 206 may have a non-rectangular geometry, such as a circular geometry, a triangular geometry, a hexagonal geometry, an irregular geometry, and so forth, to capture the profile of the electronic devices 208. Such embodiments of the mounts 206 may nevertheless include the features described herein to adjust between different configurations and secure to differently sized electronic devices 208.

Figure 3:
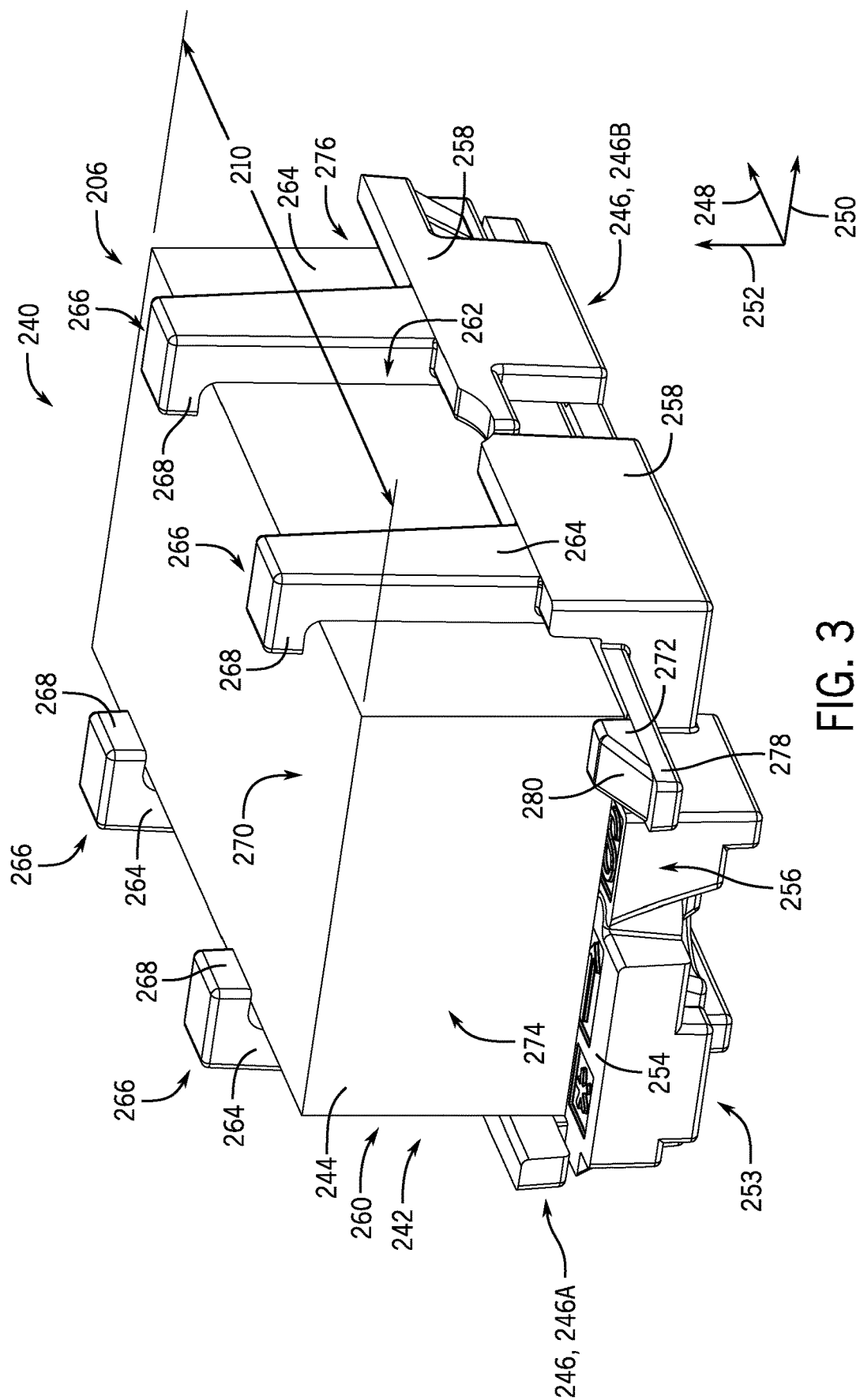
FIG. 3 is a perspective side view of an embodiment of a mount for an electronic device, in which the mount is in a compact configuration, in accordance with an aspect of the present disclosure.

FIG. 3 is a perspective side view of an embodiment of one of the mounts (e.g., electronic device mounts) 206 in a first configuration 240, which may be the compact configuration. In the first configuration 240, the mount 206 may define a first space 242 in which a first electronic device 244 may be disposed. The first electronic device 244 (e.g., the first electronic device 206A, the third electronic device 206C) may have the first, relatively shorter first dimension 210. In some embodiments, the mount 206 may include separate portions that are adjustable to one another. For example, the mount 206 may include a first mount portion (e.g., piece) 246A and a second mount portion (e.g., piece) 246B that may be coupled to one another in an assembled configuration of the mount 206. That is, the mount portions 246 may be separate components or pieces that may interface with one another to form the first configuration 240 of the mount 206. The mount 206 and its mount portions 246 may be described with reference to a first axis 248 (e.g., a longitudinal axis), a second axis 250 (e.g., a lateral axis), and a third axis 252 (e.g., a vertical axis).

The mount portions 246 may cooperatively capture the first electronic device 244 within the first space 242 to secure the first electronic device 244 to the mount 206. For example, each of the mount portions 246 may include a base 253 having a base surface 254, which may extend along a plane formed by the first axis 248 and the second axis 250. A first side 256 (e.g., a bottom side) of the first electronic device 244 may be engaged with (e.g., be placed flush against) the base surface 254 while positioned within the first space 242. Each of the mount portions 246 may also include lateral walls 258 extending along the third axis 252 and crosswise to the base surface 254. The lateral walls 258 may engage with (e.g., be placed flush against) a second side 260 and/or a third side 262 (e.g., lateral sides) of the first electronic device 244 positioned within the first space 242. Moreover, each of the mount portions 246 may include extensions 264 that extend along the third axis 252 and crosswise to the base surface 254, adjacent to and along the lateral walls 258, and beyond the lateral walls 258 along the third axis 252. For example, the extensions 264 may extend along the second side 260 and the third side 262, respectively, of the first electronic device 244 such that ends 266 of the extensions 264 extend past or beyond (e.g., above) the first electronic device 244 along the third axis 252. The lateral walls 258 and the extensions 264 may cooperatively capture the second side 260 and the third side 262 of the first electronic device 244, thereby blocking movement of the first electronic device 244 relative to the mount 206 along the second axis 250.

Each end 266 of the extensions 264 may further include a flange 268 that may extend along the second axis 250 and over the first electronic device 244, thereby overlapping with the first electronic device 244 along the third axis 252. For instance, the flanges 268 may engage with a fourth side 270 (e.g., a top side) of the first electronic device 244. In this manner, the base surface 254 and the flanges 268 may cooperatively capture the first side 256 and the fourth side 270 of the first electronic device 244, thereby blocking movement of the first electronic device 244 relative to the mount 206 along the third axis 252. Further still, each mount portion 246 may include a knob 272 extending crosswise to the base surface 254 and along the third axis 252. Each knob 272 (e.g., an inward-facing surface of each knob 272) may engage with a fifth side 274 and/or a sixth side 276, respectively, of the first electronic device 244, thereby blocking movement of the first electronic device 244 relative to the mount 206 along the first axis 248. As such, the base surface 254, the lateral walls 258, the extensions 264, and the knob 272 may cooperatively define the first space 242 that enables the mount 206 to capture the first electronic device 244.

In some embodiments, the knob 272 may facilitate insertion or positioning (e.g., manual positioning) of the first electronic device 244 into the first space 242. For example, the knob 272 may be positioned on an extended segment 278 extending from the base 253 (e.g., the base surface 254) along the first axis 248, and the knob 272 may include a knob surface 280. The knob surface 280 may be sloped relative to the base surface 254, such as along an incline toward the first space 242. The first electronic device 244 may slide along the knob surface 280 (e.g., generally along the first axis 248) toward the first space 242, such as into an opening spanning between the knob 272 and the flanges 268 of the extensions 264 along the third axis 252. Engagement between the first electronic device 244 and the knob surface 280 may impart a force (e.g., a downward force) onto the knob 272 and the extended segment 278 to cause elastic deformation, such as flexure or bending, of the extended segment 278 (e.g., relative to a remainder of the base 253 along the third axis 252). Such deformation of the extended segment 278 may increase the opening between the knob 272 and the flanges 268 of the extensions 264 to enable positioning of the first electronic device 244 within the first space 242. Upon insertion of the first electronic device 244 within the space 242, such as to engage with the base surface 254 and/or another the knob 272 of another mount portion 246, the force imparted onto the knob 272 by the first electronic device 244 may be reduced, and the elastic deformation of the extended segment 278 may cause the extended segment 278 to flex or bend and reduce the opening between the knob 272 and the flanges 268 of the extensions 264. Such flexure of the extended segment 278 may cause the knob 272 to engage with the first electronic device 244 (e.g., the fifth side 274 of the first electronic device 244) and secure the first electronic device 244 within the first space 242.

In additional or alternative embodiments, the first electronic device 244 may be inserted into the first space 242 via an opening spanning between the extensions 264 along the second axis 250. For example, a force (e.g., a manually applied force) may be applied to the extensions 264 to cause the extensions 264 to elastically deform, such as bend outwardly (e.g., away from one another) along the second axis 250, to increase such an opening between the extensions 264 and enable insertion of the first electronic device 244 into the first space 242 via the opening. Upon insertion of the first electronic device 244 into the first space 242, the extensions 264 may inwardly bend (e.g., toward one another, toward the first electronic device 244) along the second axis 250 via the elastic deformation to cause the extensions 264 to engage with the first electronic device 244, such as the second side 260, the third side 262, and/or the fourth side 270, and secure the first electronic device 244 within the first space 242. In such embodiments, the extensions 264 may include a certain profile, such as a surface (e.g., at the flanges 268) sloped downwardly toward the first space 242, to enable movement of the first electronic device 244 against the extensions 264 to drive the extensions 264 away from one another and allow insertion of the first electronic device 244 into the first space 242. As such, various features of the mount portions 246 may facilitate positioning of the first electronic device 244 within the first space 242. To enable such elastic deformation of the mount portions 246, each mount portion 246 may be made from a pliable material, such as a polymer (e.g., an injection molded plastic) and/or a composite. Indeed, the material of the mount portions 246 may enable flexure of the extensions 264 and/or the extended segment 278 via a manually applied force to enable a user to secure the first electronic device 244 to the mount 206 without usage of additional tooling (e.g., an additional fastener).

Figure 4:
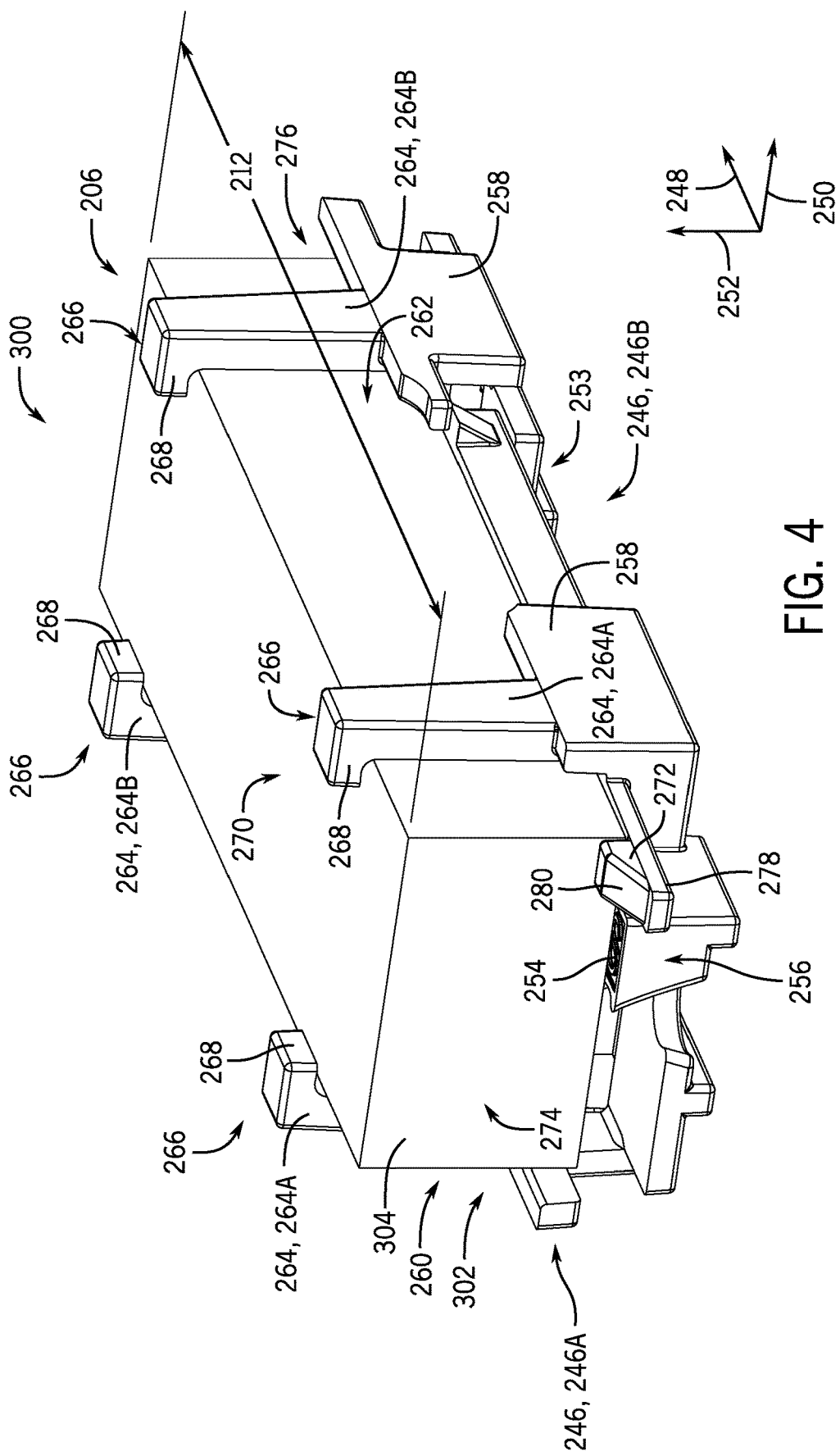
FIG. 4 is a perspective side view of an embodiment of a mount for an electronic device, in which the mount is in an extended configuration, in accordance with an aspect of the present disclosure.

FIG. 4 is a perspective side view of an embodiment of the mount 206 in a second configuration 300, which may be the extended configuration. In the second configuration 300, the base surface 254, the lateral walls 258, the extensions 264, and the knob 272 may cooperatively define a second space 302 in which a second electronic device 304 may be disposed. The second electronic device 304 (e.g., the second electronic device 208B, the fourth electronic device 208D) may have the second, relatively longer second dimension 212. For this reason, the second space 302 defined by the mount 206 in the second configuration 300 may be larger than the first space 242 defined by the mount 206 in the first configuration 240.

For example, the mount portions 246 may be adjustably coupled to one another to interchangeably adjust the mount 206 between the configurations 240, 300. For instance, in order to transition the mount 206 from the first configuration 240 to the second configuration 300, the mount portions 246 may be coupled to one another such that the knobs 272 of the mount portions 246 are placed farther apart from one another along the first axis 248 to enable receipt of the second electronic device 304 having the longer second dimension 212. Such coupling between the mount portions 246 may also place the first extensions 264A of the first mount portion 246A farther away from the second extensions 264B of the second mount portion 246B.

In the second configuration 300, the lateral walls 258 and/or the extensions 264 may cooperatively capture the second side 260 and the third side 262 of the second electronic device 304, the base surface 254 and the flanges 268 of the extensions 264 may cooperatively capture the first side 256 and the fourth side 270 of the second electronic device 304, and the knobs 272 may cooperatively capture the fifth side 274 and the sixth side 276 of the second electronic device 304 to secure the second electronic device 304 within the second space 302. The knobs 272 and/or the extensions 264 may also facilitate insertion of the second electronic device 304 into the second space 302 in the second configuration 300 of the mount 206. For example, the extended segment 278 and/or the extensions 264 may bend via an applied force (e.g., a manually applied force) to increase an opening through which the second electronic device 304 may be inserted to position the second electronic device 304 within the second space 302. Upon insertion of the second electronic device 304 into the second space 302, the extended segment 278 and/or the extensions 264 may bend to close the opening to capture the second electronic device 304 and secure the second electronic device 304 within the second space 302.

Figure 5:
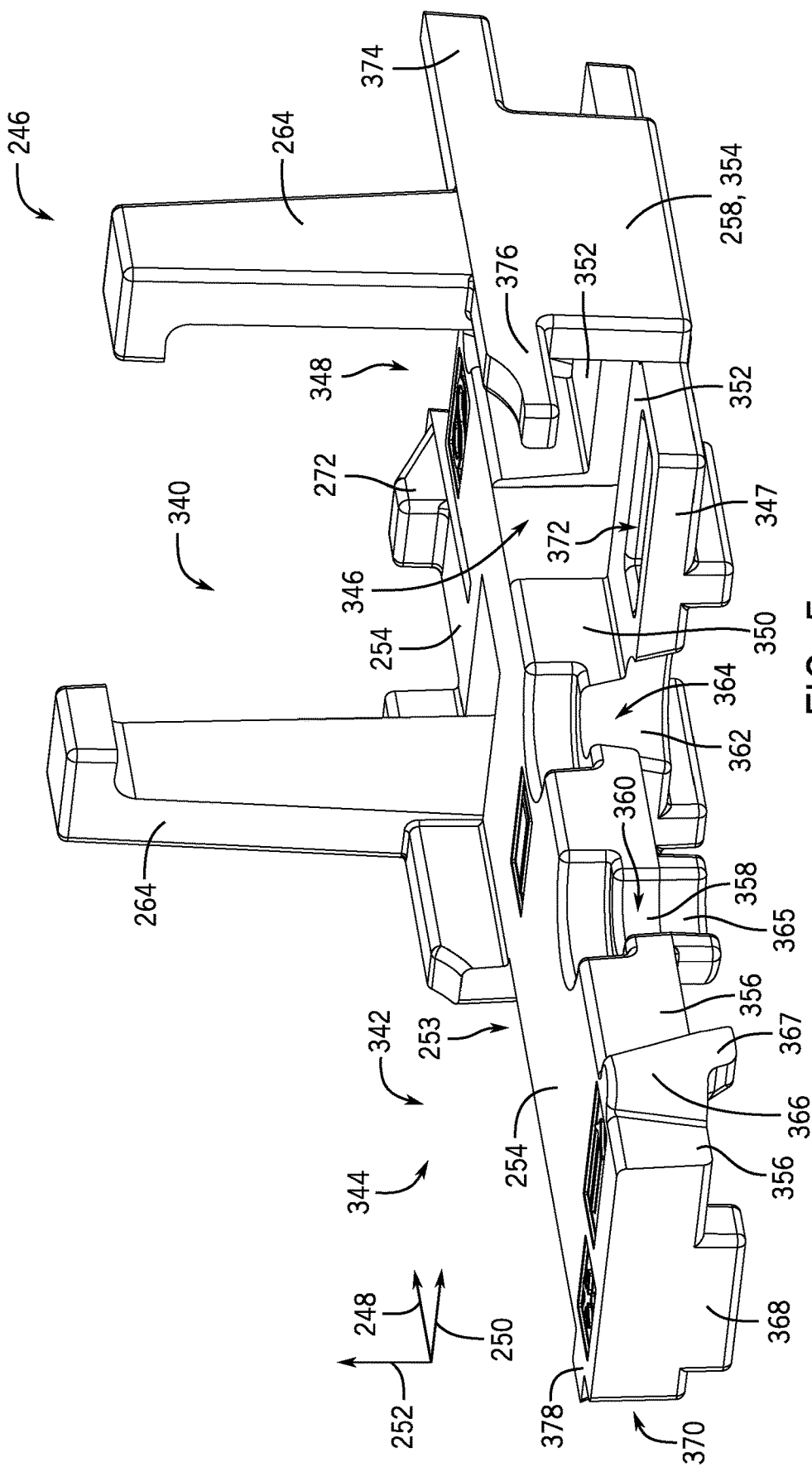
FIG. 5 is a perspective side view of an embodiment of a portion of a mount for an electronic device, in accordance with an aspect of the present disclosure.

FIG. 5 is a perspective side view of an embodiment of one of the mount portions 246 of the mount 206. The illustrated mount portion 246 may be representative of an embodiment of each mount portion 246 of the mount 206. That is, the illustrated mount portion 246 may be coupled with a similar or identical opposing mount portion 246 to form the mount 206. Indeed, multiple mount portions 246 of the illustrated embodiment may be manufactured, purchased, or otherwise provided, and any two of such mount portions 246 may be coupled to one another to form the mount 206.

The mount portion 246 may include a primary section 340, and the base 253 may extend from the primary section 340 along the first axis 248 at a first side 344 (e.g., a first lateral side) to form a protruding section 342 of the mount portion 246. Additionally, the mount portion 246 may include a channel 346 formed at a second side 348 of the mount portion 246 via the base 253 (e.g., a portion of the base 253 at the primary section 340), a channel support 347 extending from the base 253 (e.g., along the second axis 250), and a lateral wall 354 extending from the channel support 347 (e.g., along the third axis 252). In the first configuration 240 and/or the second configuration 300 in which the mount portion 246 is coupled to an opposing mount portion 246, the channel 346 may receive the protruding section 342 of the opposing mount portion 246. For example, a primary section base wall 350 of the base 253 at the primary section 340, a channel surface 352 (e.g., extending from the primary section base wall 350 along a plane formed by the first axis 248 and the second axis 250) of the channel support 347, and the lateral wall 354 may cooperatively define the channel 346 and capture the protruding section 342 of the opposing mount portion 246 to secure the protruding section 342 within the channel 346. Similarly, the protruding section 342 of the mount portion 246 may be positioned within the channel 346 of the opposing mount portion 246. For instance, a protruding section base wall 356 of the protruding section 342 may engage with (e.g., abut) the primary section base wall 350 of the opposing mount portion 246, and the primary section base wall 350, the channel surface 352, and the lateral wall 354 of the opposing mount portion 246 may cooperatively capture the protruding section 342 of the illustrated mount portion 246.

Additionally, the mount portion 246 may include a protruding section recess wall 358 that forms a protruding section recess 360 into the protruding section base wall 356 and an intermediate recess wall 362 that forms an intermediate recess 364 into the primary section base wall 350 and the protruding section base wall 356. A recess wall edge 365 of the protruding section recess wall 358 may extend beyond the protruding section base wall 356 along the third axis 252. As described herein, the recess wall edge 365 may further facilitate coupling between mount portions 146, such as in the first configuration 240 of the mount 206.

The mount portion 246 may further include an inward-facing projection 366 extending from the protruding section base wall 356 (e.g., along the second axis 250) at the protruding section 342. A projection edge 367 of the inward-facing projection 366 may also extend beyond the protruding section base wall 356 along the third axis 252. In the second configuration 300, the inward-facing projection 366 of the illustrated mount portion 246 may be inserted into the intermediate recess 364 of the opposing mount portion 246. Similarly, the intermediate recess 364 of the illustrated mount portion 246 may receive the inward-facing projection 366 of the opposing mount portion 246. For example, the inward-facing projection 366 may have a conical or sloped profile, and the intermediate recess 364 formed by the intermediate recess wall 362 may have a corresponding conical or sloped profile to capture the inward-facing projection 366. In additional or alternative embodiments, the inward-facing projection 366 may have any suitably shaped profile, and the protruding section recess 364 may have a corresponding shape to capture the inward-facing projection 366. Capture of the inward-facing projection 366 via a correspondingly shaped intermediate recess wall 362 may block movement of an opposing inward-facing projection 366 within the protruding section recess 364 (e.g., along the first axis 248, the second axis 250, the third axis 252). In this manner, the engagement between the inward-facing projection 366 and the intermediate recess wall 362 may block relative movement between the protruding sections 342 of the mount portions 246 in the second configuration 300.

The mount portion 246 may further include a jutted segment (e.g., tooth) 368 formed at a first end 370 (e.g., a first distal end) of the protruding section 342. The jutted segment 368 may also facilitate securement of the mount portion 246 to an opposing mount portion 246 in the first configuration 240 and/or in the second configuration 300. By way of example, a slot 372 may be formed through the channel support 347. In the second configuration 300, the slot 372 of the illustrated mount portion 246 may receive the jutted segment 368 of the opposing mount portion 246, and the jutted segment 368 of the illustrated mount portion 246 may similarly be inserted into the slot 372 of the opposing mount portion 246. The slot 372 at the primary section 340 may block movement of an opposing jutted segment 368 of the protruding section 342 to block movement of an opposing protruding section 342 within the channel 346, further blocking relative movement between the mount portions 246 relative to one another in the second configuration 300.

Further still, the mount portion 246 may include a distal protrusion 374 (e.g., a protrusion extending in a distal direction along the first axis 248 away from the protruding section 342) and a medial protrusion 376 (e.g., a protrusion extending in a medial direction along the first axis 248 in which the protruding section 342 extends) extending off the lateral wall 354. The distal protrusion 374 and the medial protrusion 376 may also facilitate coupling between mount portions 246. For example, the mount portion 246 may include an outward-facing projection 378. As further described below, in the first configuration 240, the outward-facing projection 378 of the illustrated mount portion 246 may engage with the distal protrusion 374 of the opposing mount portion 246 to secure the mount portions 246 to one another in the first configuration 240. In the second configuration 300, the outward-facing projection 378 of the illustrated mount portion 246 may engage with the medial protrusion 376 of the opposing mount portion 246 to secure the mount portions 246 to one another in the second configuration 300. Thus, the distal protrusion 374, the medial protrusion 376, and the outward-facing projection 378 may provide additional securement between the mount portions 246.

Figure 6:
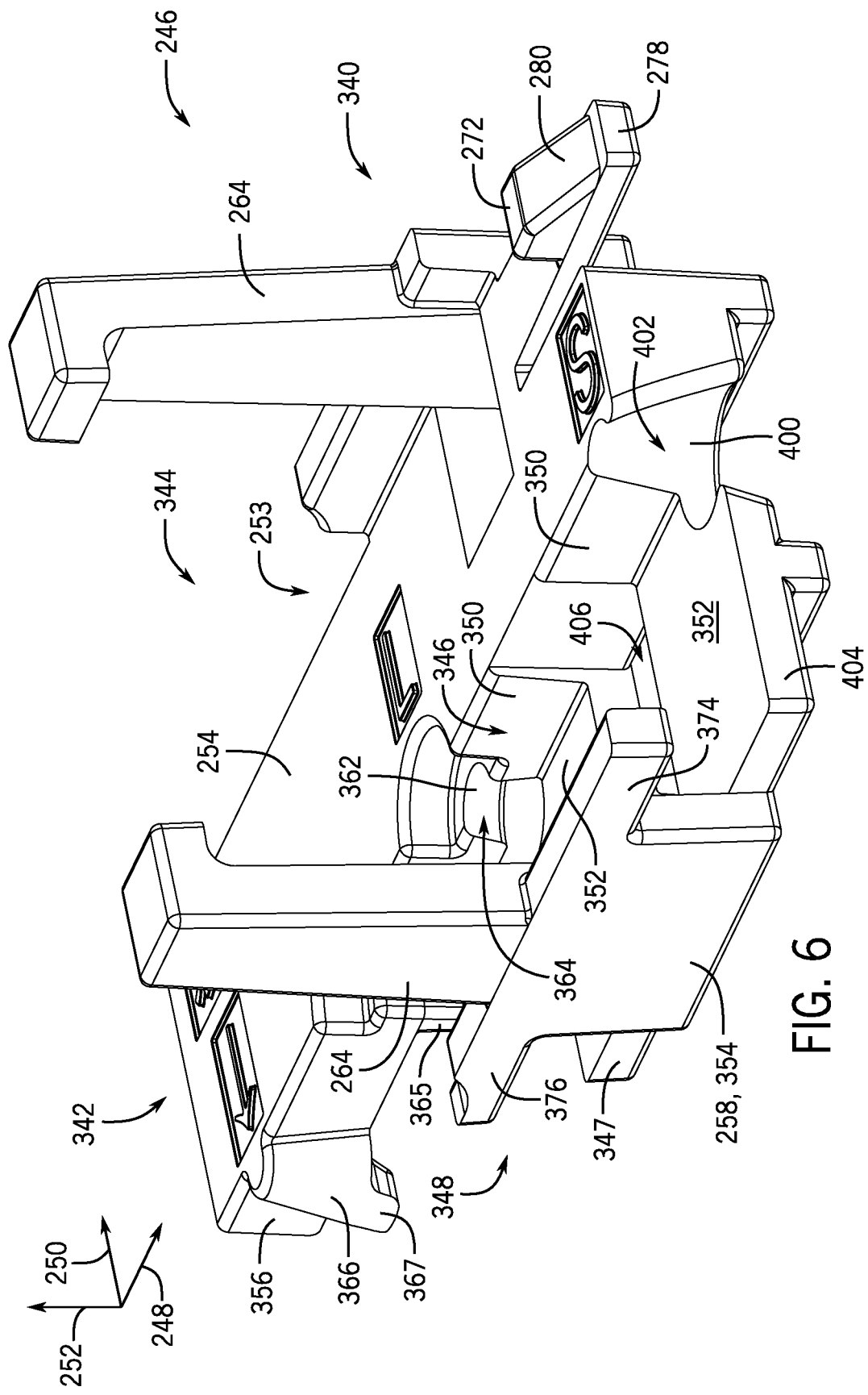
FIG. 6 is a perspective side view of an embodiment of a portion of a mount for an electronic device, in accordance with an aspect of the present disclosure.

FIG. 6 is a perspective side view of an embodiment of the mount portion 246. The mount portion 246 may include a primary section recess wall 400 that forms a primary section recess 402 into the primary section base wall 350. The intermediate recess 364 and the primary section recess 402 may be formed at opposite sides of the channel support 347 along the first axis 248. In the first configuration 240, the inward-facing projection 366 of the illustrated mount portion 246 may be inserted into the primary section recess 402 of the opposing mount portion 246, and the primary section recess 402 may receive the inward-facing projection 366 of the opposing mount portion 246. The primary section recess 402 may have a shape corresponding to that of the inward-facing projection 366 to enable the primary section recess wall 400 to capture the inward-facing projection 366 and block movement of an opposing inward-facing projection 366 within the primary section recess 402, thereby blocking relative movement between the mount portions 246 relative to one another in the first configuration 240.

The channel support 347 may include a distal surface 404, which may extend along a plane formed by the second axis 250 and the third axis 252. The mount portion 246 may also include an opening 406 formed through the channel support 347. For example, the opening 406 may be adjacent to one of the extensions 264. As further described herein, in the first configuration 240, the jutted segment 368 of the opposing mount portion 246 may abut against (e.g., be placed flush against) the distal surface 404 of the illustrated mount portion 246. Additionally, the opening 406 of the illustrated mount portion 246 may receive and capture the recess wall edge 365 of the opposing mount portion 246. The engagement between the distal surface 404 and the jutted segment 368 and/or the engagement between the opening 406 and the recess wall edge 365 may further secure the mount portions 246 to one another in the first configuration 240.

Figure 7:
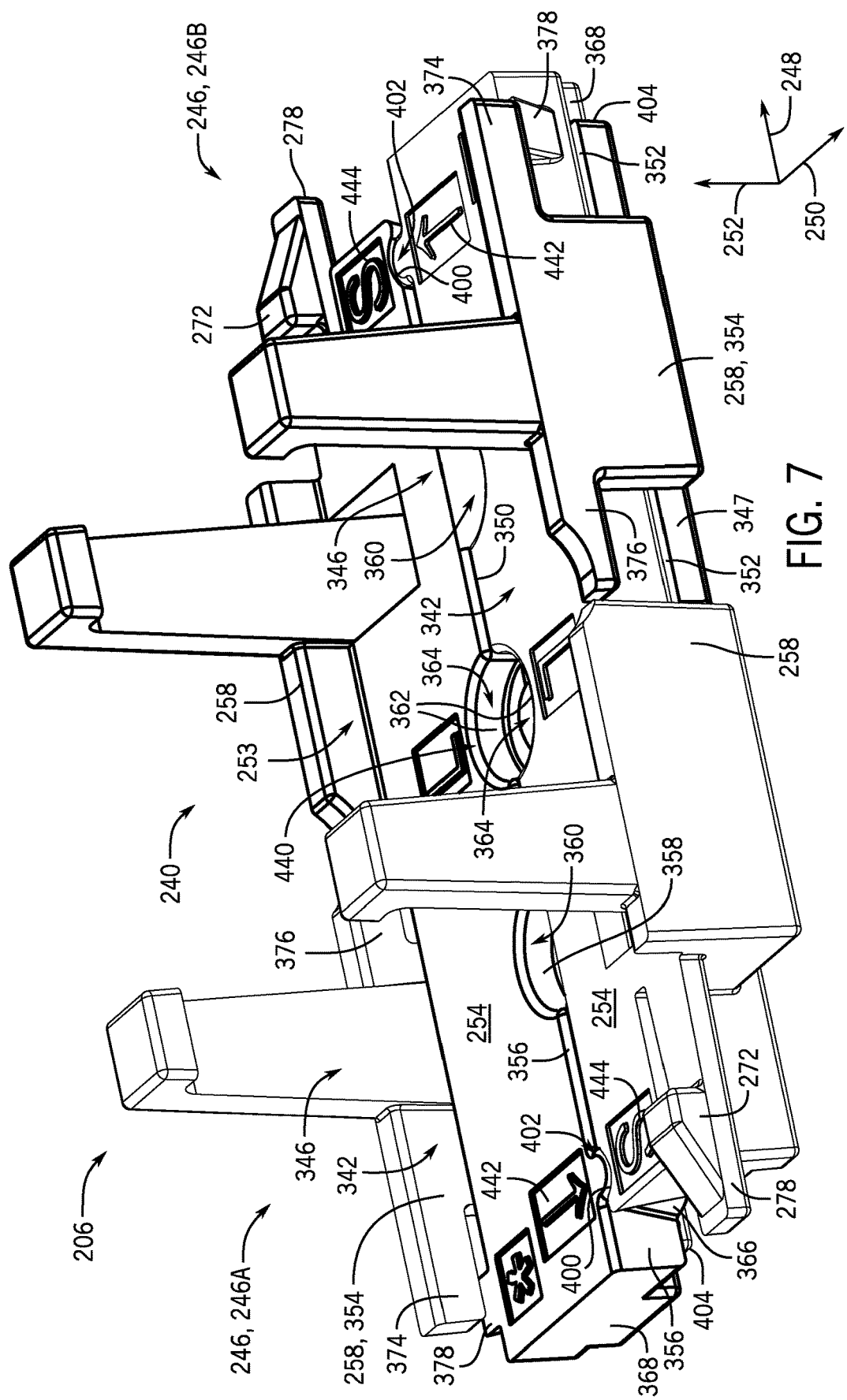
FIG. 7 is a perspective side view of an embodiment of a mount for an electronic device, in which the mount is in a compact configuration, in accordance with an aspect of the present disclosure.

FIG. 7 is a perspective side view of an embodiment of the mount 206 having the mount portions 246 in the first configuration 240. In the first configuration 240, the protruding section 342 of the first mount portion 246A may be inserted into the channel 346 of the second mount portion 246B, and the protruding section 342 of the second mount portion 246B may be inserted into the channel 346 of the first mount portion 246A. As an example, the lateral walls 258, the primary section base wall 350, and the channel surface 352 of the channel support 347 of the first mount portion 246A may cooperatively capture the protruding section 342 of the second mount portion 246B. For instance, the protruding section base wall 356 of the first mount portion 246A may abut against the primary section base wall 350 of the second mount portion 246B. The lateral walls 258, the primary section base wall 350, and the channel surface 352 of the channel support 347 of the second mount portion 246B may also cooperatively capture the protruding section 342 of the first mount portion 246A, such as via engagement (e.g., abutment) between the protruding section base wall 356 of the second mount portion 246B and the primary section base wall 350 of the first mount portion 246A. The positioning of the protruding section 342 within an opposing channel 346 may secure the mount portions 246 to one another in the first configuration 240, such as by blocking relative movement between the mount portions 246 along the second axis 250.

Additionally, in the first configuration 240, the inward-facing projection 366 of the first mount portion 246A may be inserted into the primary section recess 402 of the second mount portion 246B, and the inward-facing projection 366 of the second mount portion 246B may be inserted into the primary section recess 402 of the first mount portion 246A. The capture of the inward-facing projection 366 within the primary section recess 402 via an opposing primary section recess wall 400 may block relative movement between the mount portions 246 in any of the axes 248, 250, 252. Moreover, the jutted segment 368 of the first mount portion 246A may abut against the distal surface 404 of the second mount portion 246B, and the jutted segment 368 of the second mount portion 246B may abut against the distal surface 404 of the first mount portion 246A, thereby blocking relative movement between the mount portions 246 along the first axis 248. Further still, the outward-facing projection 378 of the first mount portion 246A may engage with the distal protrusion 374 of the second mount portion 246B, and the outward-facing projection 378 of the second mount portion 246B may engage with the distal protrusion 374 of the first mount portion 246A. Engagement between the outward-facing projection 378 and an opposing distal protrusion 374 may block relative movement between the mount portions 246 along the third axis 252. For example, the distal protrusion 374 may impart a force onto an opposing outward-facing projection 378 to block movement of the protruding section 342 out of an opposing channel 346. Such engagement between multiple features of the mount portions 246 may secure the mount 206 in the first configuration 240.

In the first configuration 240, the intermediate recess wall 362 of the first mount portion 246A and the intermediate recess wall 362 of the second mount portion 246B may engage with one another to form a hole 440. That is, the intermediate recesses 364 formed by the respective intermediate recess walls 362 may align with one another and cooperatively define the hole 440. The hole 440 may receive a fastener, such as a bolt and/or a rivet, to couple the mount 206 to another component (e.g., the mounting surface 200) in the first configuration 240. For example, the fastener may be inserted through the hole 440 and the other component, engage with each intermediate recess wall 362, and impart a force against the intermediate recess walls 362 to compress the mount portions 246 against the other component to secure the mount 206 to the other component. Thus, the hole 440 formed by the mount portions 246 in the first configuration 240 may facilitate securement of the mount 206.

In certain embodiments, each mount portion 246 may include indicators on the base surface 254, such as etchings formed into the base surface 254, to help indicate the particular configuration of the mount 206. For example, each mount portion 246 may include a signification indicator 442 (e.g., an arrow) adjacent to its inward-facing projection 366 along the base surface 254, as well as a first configuration indicator 444 adjacent to its primary section recess 402 along the base surface 254. Coupling the mount portions 246 to one another in the first configuration 240, such as by inserting each inward-facing projection 366 into an opposing primary section recess 402, may align each signification indicator 442 with an opposing first configuration indicator 444 along the first axis 248 (e.g., each signification indicator 442 may be adjacent to the opposing first configuration indicator 444 along the second axis 250). In this manner, the alignment between the signification indicator 442 and the opposing first configuration indicator 444 may indicate to a user that the mount 206 is in the first configuration 240 and help the user more easily determine the particular configuration of the mount 206.

Figure 8:
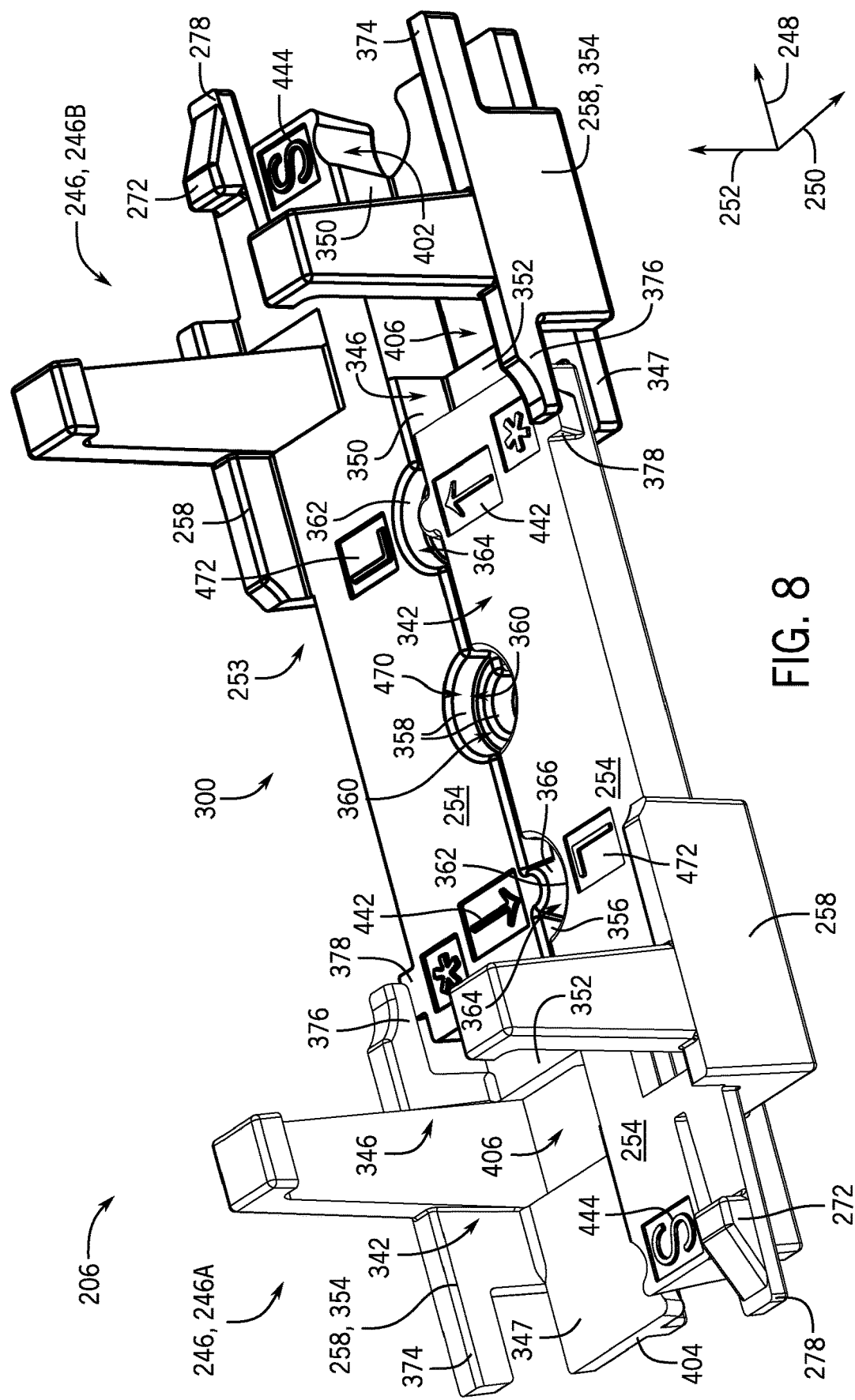
FIG. 8 is a perspective side view of an embodiment of a mount for an electronic device, in which the mount is in an extended configuration, in accordance with an aspect of the present disclosure.

FIG. 8 is a perspective side view of an embodiment of the mount 206 having the mount portions 246 in the second configuration 300. In the second configuration 300, the protruding section 342 of the first mount portion 246A may at least partially extend into the channel 346 of the second mount portion 246B, and the protruding section 342 of the second mount portion 246B may at least partially extend into the channel 346 of the first mount portion 246A. For example, the protruding section base wall 356 of the first mount portion 246A may abut against a portion of the primary section base wall 350 of the second mount portion 246B, and the protruding section base wall 356 of the second mount portion 246B may abut against a portion of the primary section base wall 350 of the first mount portion 246A. The protruding section 342 of the first mount portion 246A may also abut against a portion of the channel surface 352 of the second mount portion 246B, and/or the protruding section 342 of the second mount portion 246B may also abut against a portion of the channel surface 352 of the first mount portion 246A.

In the second configuration 300, the inward-facing projection 366 of the first mount portion 246A may be inserted into the intermediate recess 364 (e.g., having a shape corresponding to the inward-facing projection 366 of the first mount portion 246A) of the second mount portion 246B, and the inward-facing projection 366 of the second mount portion 246B may be inserted into the intermediate recess 364

(e.g., having a shape corresponding to the inward-facing projection 366 of the second mount portion 246B) of the first mount portion 246A to block relative movement between the mount portions 246 in any of the axes 248, 250, 252. The outward-facing projection 378 of the first mount portion 246A may engage with the medial protrusion 376 of the second mount portion 246B, and/or the outward-facing projection 378 of the second mount portion 246B may engage with the medial protrusion 376 of the first mount portion 246A to block relative movement between the mount portions 246 along the third axis 252.

Additionally, in the second configuration 300, the protruding section recess wall 358 of the first mount portion 246A and the protruding section recess wall 358 of the second mount portion 246B may engage with one another to form a hole 470 defined by the protruding section recesses 360 formed by the respective protruding section recess walls 358. The hole 470 may receive a fastener (e.g., a bolt, a rivet) to couple the mount 206 to another component in the second configuration 300. For example, the fastener may be inserted through the hole 470 and the other component, engage with each protruding section recess wall 358, and impart a force against the protruding section recess walls 358 to compress the mount portions 246 against the other component to secure the mount 206 to the other component.

Each mount portion 246 may also include a second configuration indicator 472 on the base surface 254 and adjacent to the corresponding intermediate recess 364 along the base surface 254. In the second configuration 300, in which the inward-facing projection 366 is inserted into an opposing intermediate recess 364, each signification indicator 442 may be aligned with an opposing second configuration indicator 472 along the first axis 248 (e.g., each signification indicator 442 may be adjacent to the opposing second configuration indicator 472 along the second axis 250). Thus, the alignment between the signification indicator 442 and the opposing second configuration indicator 472 may indicate to a user that the mount 206 is in the second configuration 300 and help the user more easily determine the particular configuration of the mount 206.

Figure 9:
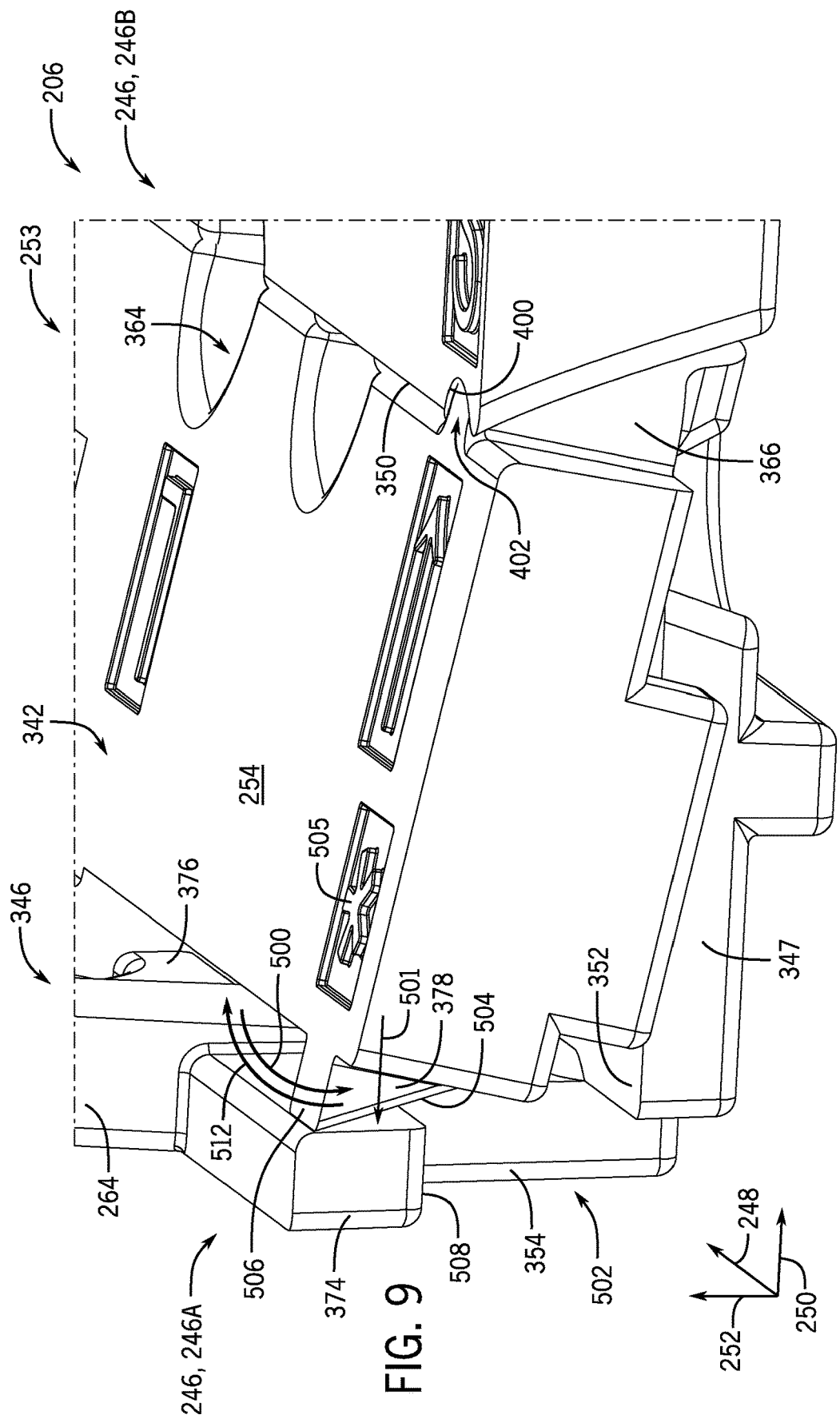
FIG. 9 is a detailed side view of an embodiment of portions of a mount for an electronic device illustrating the portions coupling to one another, in accordance with an aspect of the present disclosure.

FIG. 9 is a detailed side view of an embodiment of the mount portions 246 transitioning to couple to one another. The illustrated embodiment represents coupling of the mount portions 246 to arrange the mount 206 in the first configuration 240. However, similar features and techniques may apply to couple the mount portions 246 to one another to arrange the mount 206 in the second configuration 300.

For example, the protruding section 342 of the second mount portion 246B may be positioned in the channel 346 of the first mount portion 246A such that the inward-facing projection 366 of the second mount portion 246B is positioned within the primary section recess 402 of the first mount portion 246A and the inward-facing projection 366 of the second mount portion 246B abuts against at least a portion of the primary section recess wall 400 within the primary section recess 402. Such positioning of the protruding section 342 in the channel 346 may abut the outward-facing projection 378 of the second mount portion 246B against the distal protrusion 374 of the first mount portion 246A. The protruding section 342 of the second mount portion 246B may then be rotated (e.g., via a manually applied force) in a first rotational direction 500 about the first axis 248.

Rotation of the protruding section 342 in the first rotational direction 500 may impart a force onto the distal protrusion 374 (e.g., in an outward direction 501) to cause the distal protrusion 374 to move (e.g., bend, flex) along the second axis 250 and increase an opening spanning between the distal protrusion 374 and the primary section base wall 350. Such movement of the distal protrusion 374 may enable insertion of the outward-facing projection 378 of the second mount portion 246B into a space 502 (e.g., a vertical space) defined by the distal protrusion 374 and spanning between the distal protrusion 374 and the channel surface 352 of the first mount portion 246A along the third axis 252. As an example, the outward-facing projection 378 may include an exterior surface 504 that may extend at an oblique angle (e.g., an incline away from the base surface 254) with respect to a plane formed by the first axis 248 and the third axis 252. The exterior surface 504 of the outward-facing projection 378 of the second mount portion 246B may abut against the distal protrusion 374 of the first mount portion 246A, and the obliquely angled exterior surface 504 may facilitate driving movement of the distal protrusion 374 via a force imparted by the exterior surface 504 onto the distal protrusion 374 during movement of the protruding section 342 of the second mount portion 246B in the first rotational direction 500. Thus, the exterior surface 504 of the outward-facing projection 378 may facilitate positioning of the protruding section 342 of the second mount portion 246B within the channel 346 of the first mount portion 246A.

In some embodiments, an indicator 505 (e.g., an etching) may be formed onto the base surface 254 to facilitate coupling between the mount portions 246. For example, the indicator 505 may provide an indication where a user may apply a physical force onto the base surface 254 to cause rotation of the protruding section 342 in the first rotational direction 500. The indicator 505 may also provide a frictional force that enables the user to apply the physical force more easily to rotate the protruding section 342 in the first rotational direction 500.

Insertion of the outward-facing projection 378 of the second mount portion 246B into the space 502 may enable the primary section base wall 350, the channel surface 352, and the lateral wall 354 of the first mount portion 246A to cooperatively capture the protruding section 342 of the second mount portion 246B, thereby securing the protruding section 342 of the second mount portion 246B within the channel 346 of the first mount portion 246A. Additionally, upon positioning the outward-facing projection 378 within the space 502, the distal protrusion 374 may bend toward the base surface 254 of the protruding section 342 such that an interior surface 506 (e.g., a surface aligned with the base surface 254) of the outward-facing projection 378 may abut against a protrusion surface 508 (e.g., a surface facing the space 502) of the distal protrusion 374 to block movement of the outward-facing projection 378 out of the space 502. In this manner, the engagement between the distal protrusion 374 of the first mount portion 246A and the outward-facing projection 378 of the second mount portion 246B may further secure the protruding section 342 of the second mount portion 246B within the channel 346 of the first mount portion 246A for the first configuration 240.

The protruding section 342 of the first mount portion 246A may similarly be secured within the channel 346 of the second mount portion 246B. For example, the inward-facing projection 366 of the first mount portion 246A may be positioned within the primary section recess 402 of the second mount portion 246B to cause the outward-facing projection 378 of the first mount portion 246A to abut against the distal protrusion 374 of the second mount portion 246B. The protruding section 342 of the first mount portion 246A may then be rotated to move the distal protrusion 374 of the second mount portion 246B to enable insertion of the outward-facing projection 378 of the first mount portion 246A into the space 502 of the second mount portion 246B and secure the protruding section 342 of the first mount portion 246A within the channel 346 of the second mount portion 246B.

The mount portions 246 may also be decoupled from one another by moving (e.g., manually moving) the distal protrusion 374. As an example, the distal protrusion 374 of one of the mount portions 246 may be moved (e.g., bent, flexed) in the outward direction 501, such as via a physically applied force, to enable rotation of the protruding section 342 of the other of the mount portions 246 (e.g., in a second rotational direction 512, opposite the first rotational direction 500) to remove the outward-facing projection 378 of the other of the mount portions 246 from the space 502. Upon removal of the outward-facing projection 378 from the space 502, the protruding section 342 may be removed from the channel 346 to separate the mount portions 246 from one another. Additionally or alternatively, the extensions 264 of the mount portions 246 (e.g., the extensions 264 that are positioned diagonally opposite of one another) may be outwardly bent (e.g., in the outward direction 501), such as using a physically applied force, to enable decoupling between the mount portions 246. For example, outwardly bending the extensions 264 may move the distal protrusions 374 in the outward direction 501 and also cause rotation of the mount portions 246 in the second rotational direction 512 to decouple the mount portions 246 from one another.

A similar technique may also be used to couple the mount portions 246 to one another to arrange the mount 206 in the second configuration 300. By way of example, the inward-facing projection 366 of one of the mount portions 246 may be positioned within the intermediate recess 364 of the other of the mount portions 246 to cause the outward-facing projection 378 of the mount portion 246 to abut against the medial protrusion 376 of the other of the mount portions 246. The mount portions 246 may then be rotated relative to one another to cause movement of the medial protrusion 376 that enables insertion of the outward-facing projection 378 in a space defined by the medial protrusion 376 and secure the mount portions 246 to one another in the second configuration 300.

Coupling of the mount portions 246 to one another and/or decoupling of the mount portions 246 from one another for either configuration 240, 300 may be performed manually, such as via a manually applied force. Indeed, the material structure of the mount portions 246 may enable a user to manually couple the mount portions 246 to one another and/or decouple the mount portions 246 from one another without usage of additional tooling (e.g., an additional fastener).

Figure 10:
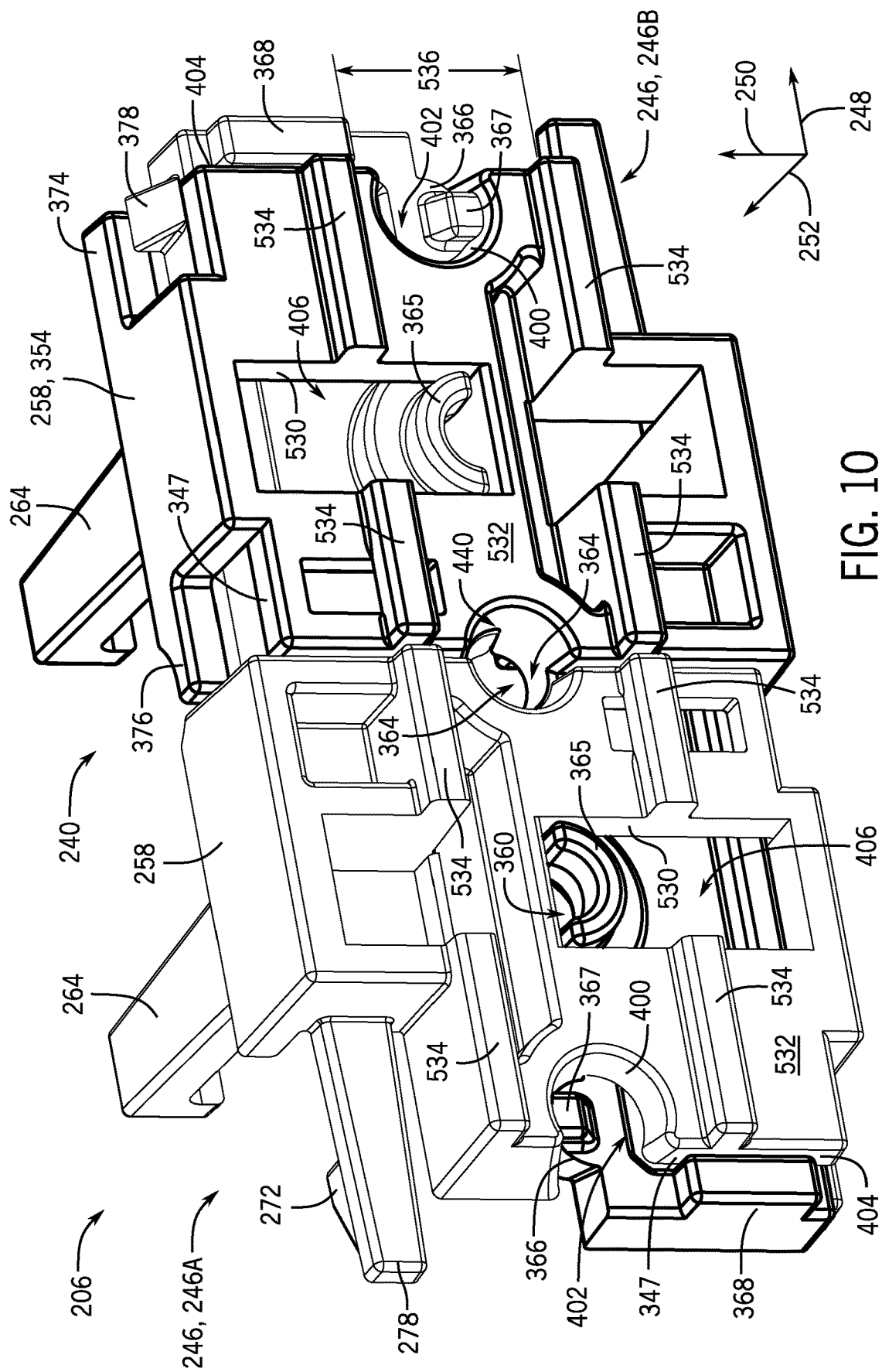
FIG. 10 is a perspective bottom view of an embodiment of a mount for an electronic device, in which the mount is in a compact configuration, in accordance with an aspect of the present disclosure.

FIG. 10 is a perspective bottom view of an embodiment of the mount 206 having the mount portions 246 in the first configuration 240. In the first configuration 240, the projection edge 367 of the inward-facing projection 366 of the second mount portion 246B may abut against the primary section recess wall 400 of the first mount portion 246A, and the projection edge 367 of the inward-facing projection 366 of the first mount portion 246A may abut against the primary section recess wall 400 of the second mount portion 246B, thereby blocking relative movement between the mount portions 246 along the first axis 248 and/or the second axis 250. Additionally, the recess wall edge 365 of the second mount portion 246B may be positioned within the opening 406 of the channel support 347 of the first mount portion 246A such that channel opening walls 530 of the channel support 347 within the opening 406 of the first mount portion 246A capture the recess wall edge 365 of the second mount portion 246B. The recess wall edge 365 of the first mount portion 246A may be positioned within the opening 406 of the channel support 347 of the second mount portion 246B such that the channel opening walls 530 within the opening 406 of the second mount portion 246B capture the recess wall edge 365 of the first mount portion 246A. Capture of the recess wall edge 365 via opposing channel opening walls 530 may further block relative movement between the mount portions 246, such as along the first axis 248 and/or the second axis 250.

In some embodiments, the base 253 of each mount portion 246 may also include an interface surface 532 positioned opposite the base surface 254, and each mount portion 246 may include lips 534 extending from the interface surface 532 along the third axis 252. The lips 534 may facilitate coupling of the mount 206 to another component. For example, a set of lips 534 of each mount portion 246 may be offset from one another along the second axis 250 by a distance 536 (e.g., a lateral distance) to enable the lips 534 to cooperatively capture a clip, an adhesive, or another component, which may then be coupled to the mounting surface 200 to couple the mount 206a to the mounting rail 202. For example, the component may be inserted between the lips 534, and the lips 534 may abut against the component, thereby blocking relative movement between the mount 206 and the component. The component may secure to the mounting rail 202 and/or directly to the mounting surface 200, thereby blocking relative movement between the mount 206 and the mounting surface 200. In additional or alternative embodiments, the lips 534 and/or the interface surfaces 532 may abut against another component, such as directly onto the mounting surface 200, to secure the mount 206 to the other component (e.g., via a fastener inserted through the hole 440).

Figure 11:
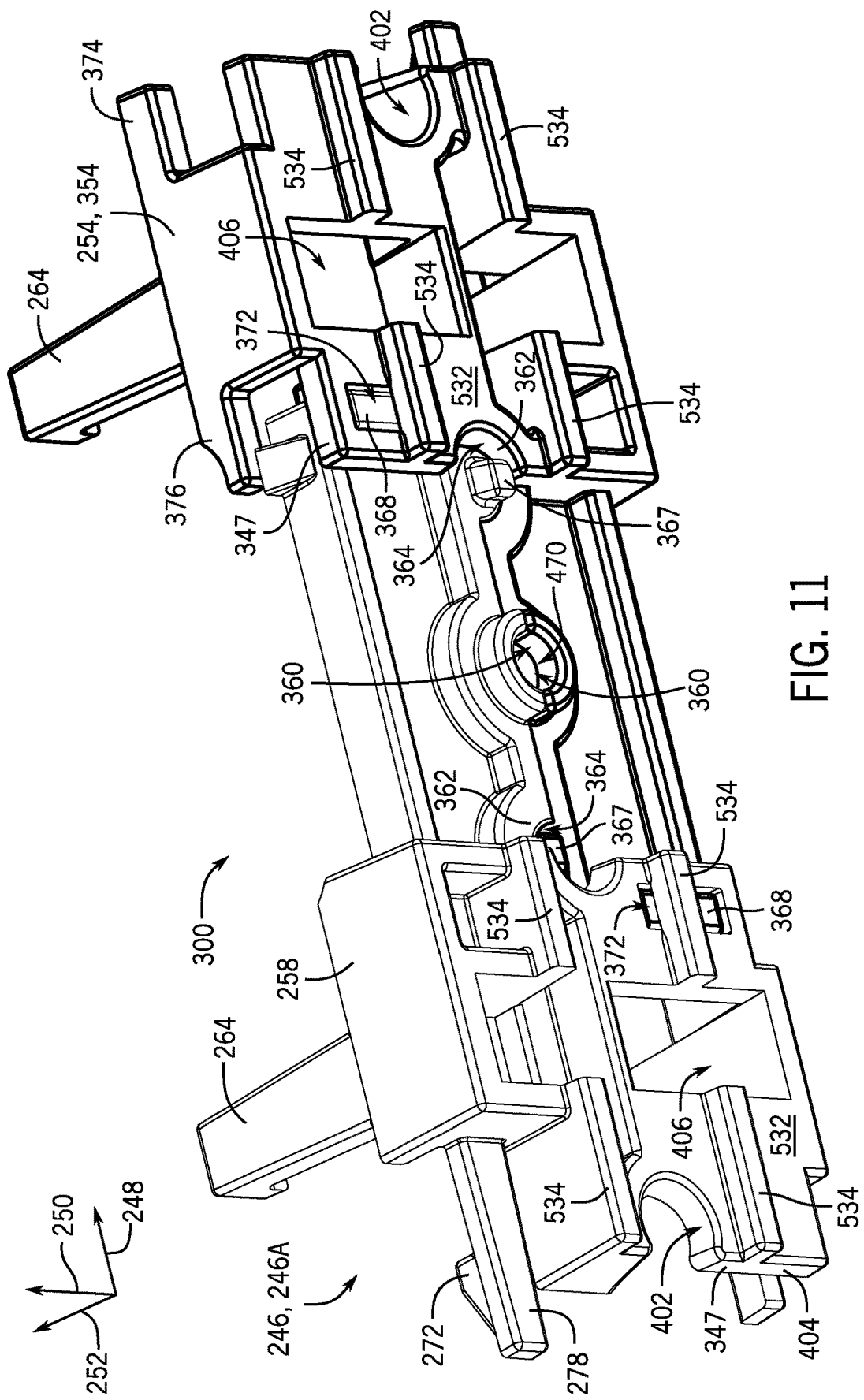
FIG. 11 is a perspective bottom view of an embodiment of a mount for an electronic device, in which the mount is in an extended configuration, in accordance with an aspect of the present disclosure.

FIG. 11 is a perspective bottom view of an embodiment of the mount 206 having the mount portions 246 in the second configuration 300. In the second configuration 300, the projection edge 367 of the inward-facing projection 366 of the second mount portion 246B may abut against the intermediate recess wall 362 of the first mount portion 246A, and the projection edge 367 of the inward-facing projection 366 of the first mount portion 246A may abut against the intermediate recess wall 362 of the second mount portion 246B, thereby blocking relative movement between the mount portions 246 along the first axis 248 and/or the second axis 250. Additionally, the jutted segment 368 of the second mount portion 246B may be positioned within the slot 372 of the channel support 347 of the first mount portion 246A, and/or the jutted segment 368 of the first mount portion 246A may be positioned within the slot 372 of the channel support 347 of the second mount portion 246B, thereby further blocking relative movement between the mount portions 246, such as along the first axis 248 and/or the second axis 250.

The lips 534 of the mount portions 246 may facilitate coupling of the mount 206 to another component, such as the mounting surface 200, in the second configuration 300. The lips 534 may, for example, abut against the other component. The interface surfaces 532 of the mount portions 246 may also abut against the other component to secure the mount portions 246 to the other component. For instance, a fastener inserted through the hole 470 formed in the second configuration 300 and the other component may cause the interface surfaces 532 and/or the lips 534 of the mount 206 to abut against the other component and secure the mount 206 to the other component.

While specific embodiments and applications of the disclosure have been illustrated and described, it is to be noted that the disclosure is not limited to the precise configurations and devices disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be noted that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. A mount for an electronic device, comprising:
   a first mount portion comprising a first base and a first extension extending crosswise to a first base surface of the first base; and
   a second mount portion comprising a second base, a channel surface extending from a first lateral wall of the second base, a second lateral wall extending from the channel surface, wherein the first lateral wall and the second lateral wall extend from different ends of the channel surface, and a second extension extending crosswise to a second base surface of the second base, wherein the first lateral wall of the second base, the channel surface, and the second lateral wall define a channel configured to receive the first base of the first mount portion, and the first base surface, the second base surface, the first extension, and the second extension cooperatively define a space configured to receive the electronic device.

2. The mount of claim 1, wherein the first base of the first mount portion comprises a projection, and the second base of the second mount portion comprises a first recess configured to receive the projection while the first base is positioned within the channel of the second mount portion.

3. The mount of claim 2, wherein the first recess of the second base is configured to receive the projection in a first configuration of the mount in which the first base is positioned within the channel, the second base of the second mount portion comprises a second recess configured to receive the projection in a second configuration of the mount in which the first base is positioned within the channel, and the mount is configured to interchangeably adjust between the first configuration and the second configuration.

4. The mount of claim 3, wherein the first recess and the second recess are positioned at opposite sides of the channel of the second mount portion.

5. The mount of claim 3, wherein the first base of the first mount portion comprises a third recess, and the third recess of the first mount portion and the second recess of the second mount portion cooperatively define a hole configured to receive a fastener in the first configuration of the mount.

6. The mount of claim 1, wherein the first base of the first mount portion comprises a projection, the second mount portion comprises a protrusion extending from the second lateral wall, and the projection of the first mount portion is configured to engage with the protrusion of the second mount portion while the first base is positioned within the channel of the second mount portion.

7. The mount of claim 1, wherein the first base of the first mount portion comprises a first interface surface, opposite the first base surface, the second base of the second mount portion comprises a second interface surface, opposite the second base surface, each of the first base surface and the second base surface comprises a plurality of lips extending from the first interface surface and the second interface surface, respectively, and the plurality of lips is configured to capture a clip, an adhesive, or both configured to secure the mount to a surface.

8. A mount piece for an electronic device mount, comprising:
   a base extending from a primary section of the mount piece to a protruding section of the mount piece, wherein the base comprises a first recess formed at the primary section and a second recess formed between the primary section and the protruding section;
   a channel surface extending from a first lateral wall of the base at the protruding section; and
   a second lateral wall extending from the channel surface, wherein the first lateral wall and the second lateral wall extend from different ends of the channel surface, and wherein the first lateral wall of the base, the channel surface, and the second lateral wall cooperatively define a channel at the primary section.

9. The mount piece of claim 8, wherein the base comprises a projection formed at the protruding section, and the projection is configured to engage with an opposing recess of an opposing mount piece coupled to the mount piece to form the electronic device mount.

10. The mount piece of claim 8, wherein the base comprises a third recess formed at the protruding section, and the third recess is configured to align with an opposing third recess of an opposing mount piece coupled to the mount piece to form the electronic device mount, and the third recess is configured to receive a fastener.

11. The mount piece of claim 8, comprising an extension extending along the second lateral wall and crosswise to a base surface of the base.

12. The mount piece of claim 8, wherein the second recess is configured to engage with an opposing recess of an opposing mount piece coupled to the mount piece to form a hole of the electronic device mount, the second recess is configured to engage with a projection of the opposing mount piece coupled to the mount piece, or both.

13. The mount piece of claim 8, wherein the base comprises a base surface, the mount piece comprises an extended segment extending from the base surface and configured to bend relative to the base, and the extended segment comprises a knob extending crosswise to the base surface.

14. An electronic device mount, comprising:
a first mount portion comprising a first base, wherein the first base comprises a first recess and a second recess formed into a first wall of the first base; and
a second mount portion comprising a second base, wherein the second base comprises a projection extending from a second wall of the second base, the projection is configured to engage with the first recess of the first mount portion in a first configuration of the electronic device mount, and the projection is configured to engage with the second recess of the first mount portion, instead of the first recess, in a second configuration of the electronic device mount to interchangeably adjust the electronic device mount between the first configuration and the second configuration.

15. The electronic device mount of claim 14, wherein the first wall of the first base and the second wall of the second base are configured to engage with one another in the first configuration and in the second configuration of the electronic device mount.

16. The electronic device mount of claim 14, wherein the second mount portion comprises a channel support with a channel surface extending from the second wall of the second base, and the channel surface is configured to engage with the first base of the first mount portion in the first configuration and in the second configuration of the electronic device mount.

17. The electronic device mount of claim 16, wherein the channel support comprises a slot formed therethrough, the first base of the first mount portion comprises a jutted segment, the jutted segment of the first base abuts against a distal surface of the channel support in the first configuration of the electronic device mount, and the jutted segment extends into the slot in the second configuration of the electronic device mount.

18. The electronic device mount of claim 16, wherein the second mount portion comprises a lateral wall extending from the channel support and a first protrusion and a second protrusion extending in opposite directions from the lateral wall, the first mount portion comprises an additional projection, the additional projection is configured to engage with the first protrusion in the first configuration of the electronic device mount, and the additional projection is configured to engage with the second protrusion in the second configuration of the electronic device mount.

19. The electronic device mount of claim 14, wherein the first base comprises a third recess formed into the first wall of the first base, the second base comprises a fourth recess and a fifth recess formed into the second wall of the second base, the fourth recess is configured to align with the second recess of the first mount portion in the first configuration of the electronic device mount to form a first hole configured to receive a fastener, and the fifth recess is configured to align with the third recess of the first mount portion in the second configuration of the electronic device mount to form a second hole configured to receive an additional fastener.

20. The electronic device mount of claim 19, wherein the first base comprises an additional projection extending from the first wall of the first base, and the additional projection is configured to engage with the fourth recess of the second base in the second configuration of the electronic device mount.

* * * * *